United States Patent
Panchal et al.

(10) Patent No.: US 9,609,558 B2
(45) Date of Patent: Mar. 28, 2017

(54) RESTORING CONNECTIVITY OF A USER DEVICE TO AN LTE NETWORK

(71) Applicant: Verizon Patent and Licensing Inc., Arlington, VA (US)

(72) Inventors: Jignesh S. Panchal, Somerset, NJ (US); Sanyogita Shamsunder, Basking Ridge, NJ (US); Lily Zhu, Parsippany, NJ (US); Andrew E. Youtz, Princeton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/715,243

(22) Filed: May 18, 2015

(65) Prior Publication Data

US 2016/0345218 A1  Nov. 24, 2016

(51) Int. Cl.

| H04W 36/00 | (2009.01) |
|---|---|
| H04W 36/02 | (2009.01) |
| H04B 7/26 | (2006.01) |
| H04W 88/06 | (2009.01) |
| H04W 36/14 | (2009.01) |

(52) U.S. Cl.
CPC ........ H04W 36/023 (2013.01); H04B 7/2628 (2013.01); *H04W 36/0022* (2013.01); *H04W 36/14* (2013.01); *H04W 88/06* (2013.01)

(58) Field of Classification Search
CPC ............... H04W 36/023; H04W 88/06; H04W 36/0022; H04W 36/14; H04B 7/2628
See application file for complete search history.

(56) References Cited

U.S. PATENT DOCUMENTS

| 2012/0258707 A1* | 10/2012 | Mathias | H04W 36/30 455/426.1 |
| 2013/0322274 A1* | 12/2013 | Zakrzewski | H04W 28/021 370/252 |
| 2013/0344872 A1* | 12/2013 | Nukala | H04W 36/14 455/437 |
| 2014/0051449 A1* | 2/2014 | Yerrabommanahalli | H04W 36/30 455/437 |
| 2014/0071940 A1* | 3/2014 | Swaminathan | H04W 48/18 370/331 |
| 2015/0009816 A1* | 1/2015 | Hsu | H04W 28/0221 370/230.1 |
| 2016/0029274 A1* | 1/2016 | Ng | H04W 36/14 455/437 |

* cited by examiner

Primary Examiner — Barry Taylor

(57) ABSTRACT

User devices may search for cellular networks that provide the best available service, such as Long-Term Evolution ("LTE") networks. If such a network is unavailable, the user device may connect to a different network, such as a Code Division Multiple Access 2000 1X network. When connected to the 1X network, the user device may not attempt to search for the LTE network unless the user device enters an idle mode, even if the LTE network becomes available while connected to the 1X network. Systems and/or methods, described herein, may "force" the user device into idle mode, while the user device is actively communicating via the 1X network, so that the user device may search for the LTE network. Forcing the user device into idle mode may include interrupting communications, which may include causing traffic, output by network applications of the user device, to not be transmitted from the user device.

20 Claims, 12 Drawing Sheets

RESTORING CONNECTIVITY OF A USER DEVICE TO AN LTE NETWORK

BACKGROUND

A user device (such as a cellular phone) may search for a cellular network that provides the best available service. For example, the user device may search for a Long-Term Evolution ("LTE") network and/or a similar type of network. If such a network is unavailable (e.g., if the user device is located in a geographic region in which LTE service is unavailable), the user device may search for a different network for which service is available (e.g., a 1X network, a 2G network, a 3G network, etc.). The user device, for example, may attach to a 1X network in order to maintain cellular service when an LTE network (or similar network) is unavailable. While service interruption may be avoided by way of attaching to the 1X network, service quality may suffer when the user device is connected to the 1X network in relation to an LTE network.

DETAILED DESCRIPTION OF THE PREFERRED EMBODIMENTS

The following detailed description refers to the accompanying drawings. The same reference numbers in different drawings may identify the same or similar elements.

In order to avoid service interruption, a user device may attach to an alternate network (e.g., a Code Division Multiple Access 2000 1X network (hereinafter referred to as a "1X network"), a second generation ("2G") network, a third generation ("3G") network, etc.) when a Long-Term Evolution ("LTE") network is unavailable (e.g., when the user device moves to a geographic location in which the network is unavailable, but where a 1X network is available). When a user device attaches to the 1X network, the user device may remain attached to the 1X network for longer than necessary, even if the LTE network later becomes available (e.g., when the user device later moves to a region in which the LTE network is available). For example, the user device may remain attached to the 1X network while the user device is actively transmitting and/or receiving data via the 1X network. The user device may not attempt to search for the LTE network until the user device enters a "1X idle" mode (e.g., a mode in which the user device is no longer actively transmitting and/or receiving data via the 1X network).

In some implementations, the user device may communicate via the 1X network for a substantially long period of time, since data transmission via the 1X network can be substantially slower than data transmission via the LTE network. Thus, it may take a relatively long period of time for the user device to enter the 1X idle mode, and subsequently search for a signal associated with the LTE network (and in turn, restore a connection with the LTE network). That is, the user device may remain attached to the 1X network even if an LTE network is available, thereby increasing network load on the 1X network, and possibly reducing user satisfaction.

Systems and/or methods, as described herein, may "force" a user device to enter a "1X idle" mode so that the user device may search for the LTE network faster than when the user device is not forced into the 1X idle mode. In turn, the user device may attach to the LTE network faster than when the user device is not forced into the 1X idle mode, thereby potentially improving user experience and reducing load on the 1X network.

Figure 1A:
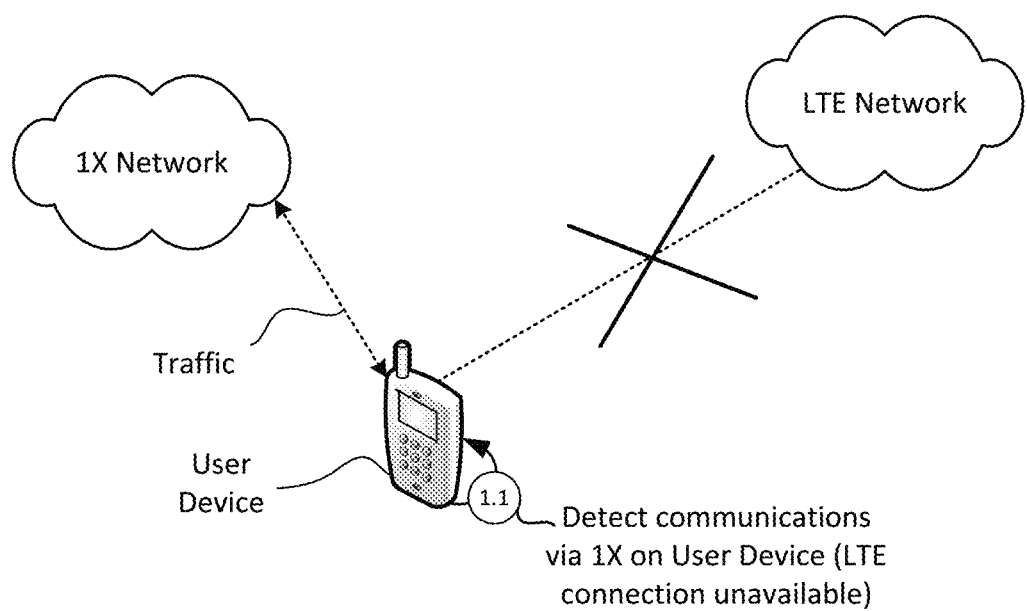
FIGS. 1A-1C illustrate an example overview of an implementation described herein.
Figure 1B:
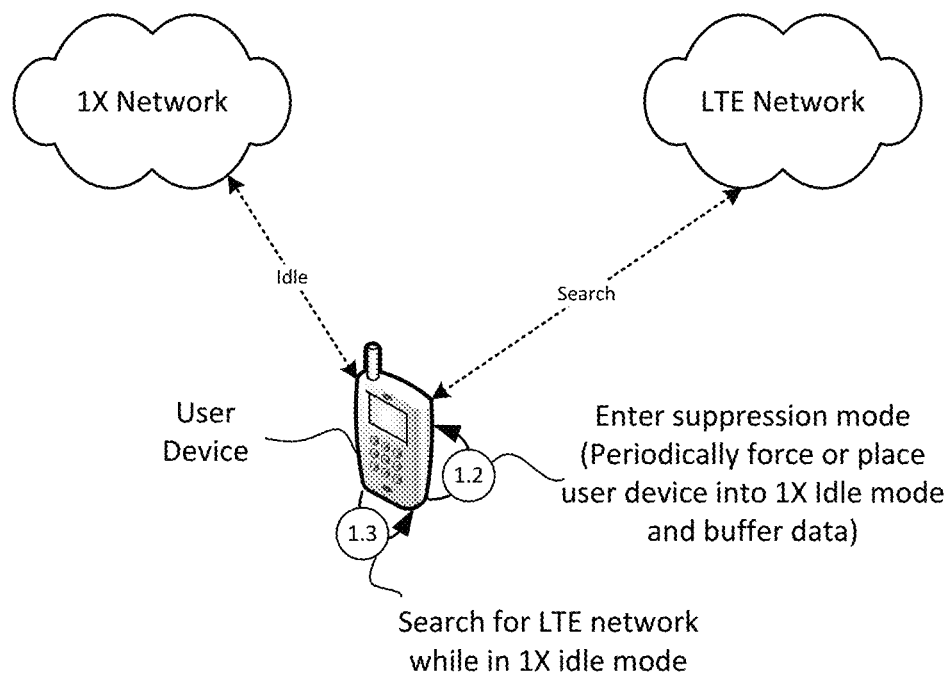
Figure 1C:
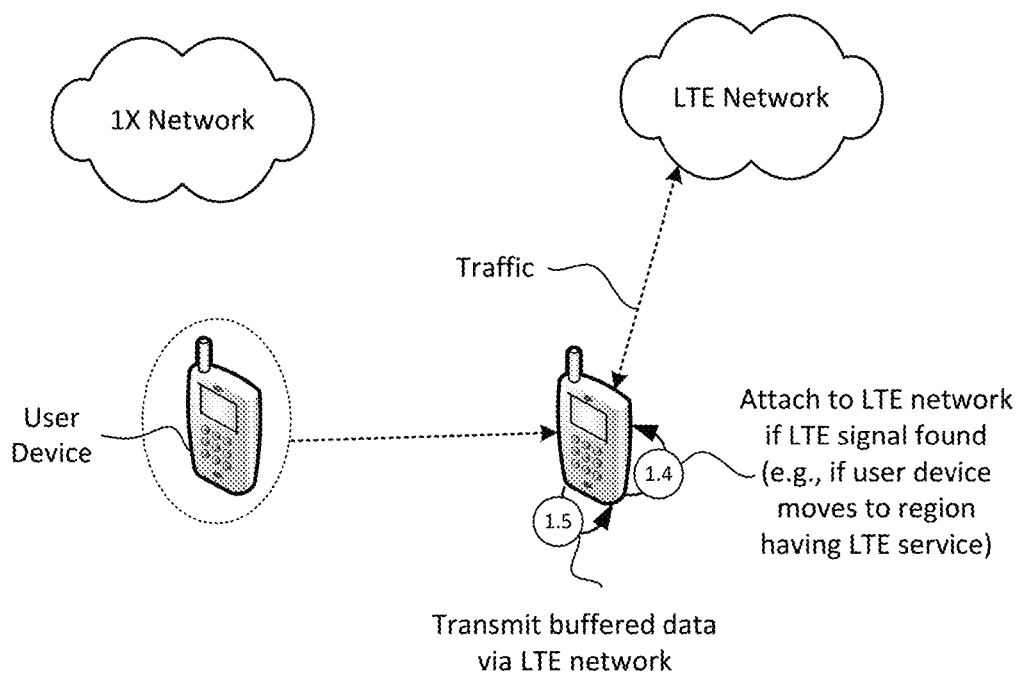

FIGS. 1A-1C illustrate an example overview of an implementation described herein. As shown in FIG. 1A, a user device may communicate via a 1X network when an LTE network is unavailable (e.g., if the user device travels away from a geographic region in which the LTE network is available and to a geographic region in which the 1X network is available). The user device may detect that the user device is communicating via the 1X network when a connection to the LTE network is unavailable (arrow 1.1). As discussed above, the user device typically continues communications via the 1X network, and may not search for the LTE network (and, in turn, may not restore its connection to the LTE network) until the user device has entered a 1X idle mode.

Referring to FIG. 1B, in accordance with some implementations, the user device may enter a suppression mode, whereby the user device periodically forces or places itself into a 1X idle mode when connected to the 1X network (arrow 1.2). For example, after a particular period of time as passed since the user device has been communicating with the 1X network, the user device may temporarily discontinue use of the 1X network, thereby placing the user device into the 1X idle mode (e.g., even if the user device had been actively transmitting and/or receiving traffic via the 1X network). For example, the user device may place itself into the 1X idle mode by temporarily buffering network data instead of transmitting the data via the 1X network. Once the user device is in the 1X idle mode, the user device may search for an LTE signal while in the 1X idle mode (arrow 1.3).

Referring to FIG. 1C, the user device may attach to the LTE network if an LTE signal is found while the user device is in 1X idle mode (arrow 1.4). For example, the user device may attach to the LTE network if the user device has moved to a location in which an LTE signal is available. The user device may then transmit traffic that had been previously buffered while the user device was in 1X idle mode via the LTE network (arrow 1.5).

As such, the user device may search for an LTE signal within a shorter amount of time than if the user device was not forced into the 1X idle mode. If an LTE signal is still unavailable, the user device may resume communications via the 1X network, and the user device may again, at a later time, force itself into the 1X idle mode in order to search for an LTE network signal within a shorter period of time than if the user device was not forced into 1X idle mode.

As described in greater detail below, the user device may periodically place itself into the 1X idle mode at particular intervals (e.g., every 15 seconds, every 30 seconds, etc.). These intervals may steadily increase if an LTE signal is not found. For example, the user device may place itself into 1X idle mode after the user device has been communicating via the 1X network for 15 seconds. If an LTE signal is not found after the user device has been placed in 1X idle mode, the user device may reestablish a connection with the 1X network, and the user device may place itself into the 1X idle mode after the user device has been communicating via the 1X network for 30 seconds. If, again an LTE signal is not found after the user device is placed into the 1X idle mode, the user device may reestablish a connection with the 1X network, and the user device may place itself into the 1X idle mode after 60 seconds.

As further described in greater detail below, the user device may discontinue network communications associated with particular applications (e.g., applications running in a background of the user device). In some implementations, discontinuing network communications of such applications may cause the user device to enter a 1X idle mode, and in turn, search for an LTE signal. In some implementations, the amount of time that the user device spends to search for an LTE signal may be increased in order to increase the chances of the user device locating the LTE signal. In some implementations, a threshold LTE signal strength, via which the user device may attach to the LTE network, may be reduced to increase the chances of the user device attaching to the LTE network.

While the systems and/or methods are described in terms of a 1X network, in practice, the systems and/or methods are not so limited. For example, the user device may enter a suppression mode when connected to another type of network, including or excluding a 1X network (e.g., a Global System for Mobile ("GSM") network, Universal Mobile Telecommunications System ("UMTS") network, an Evolution-Data Optimized ("EVDO") network, and/or other type of network).

Figure 2:
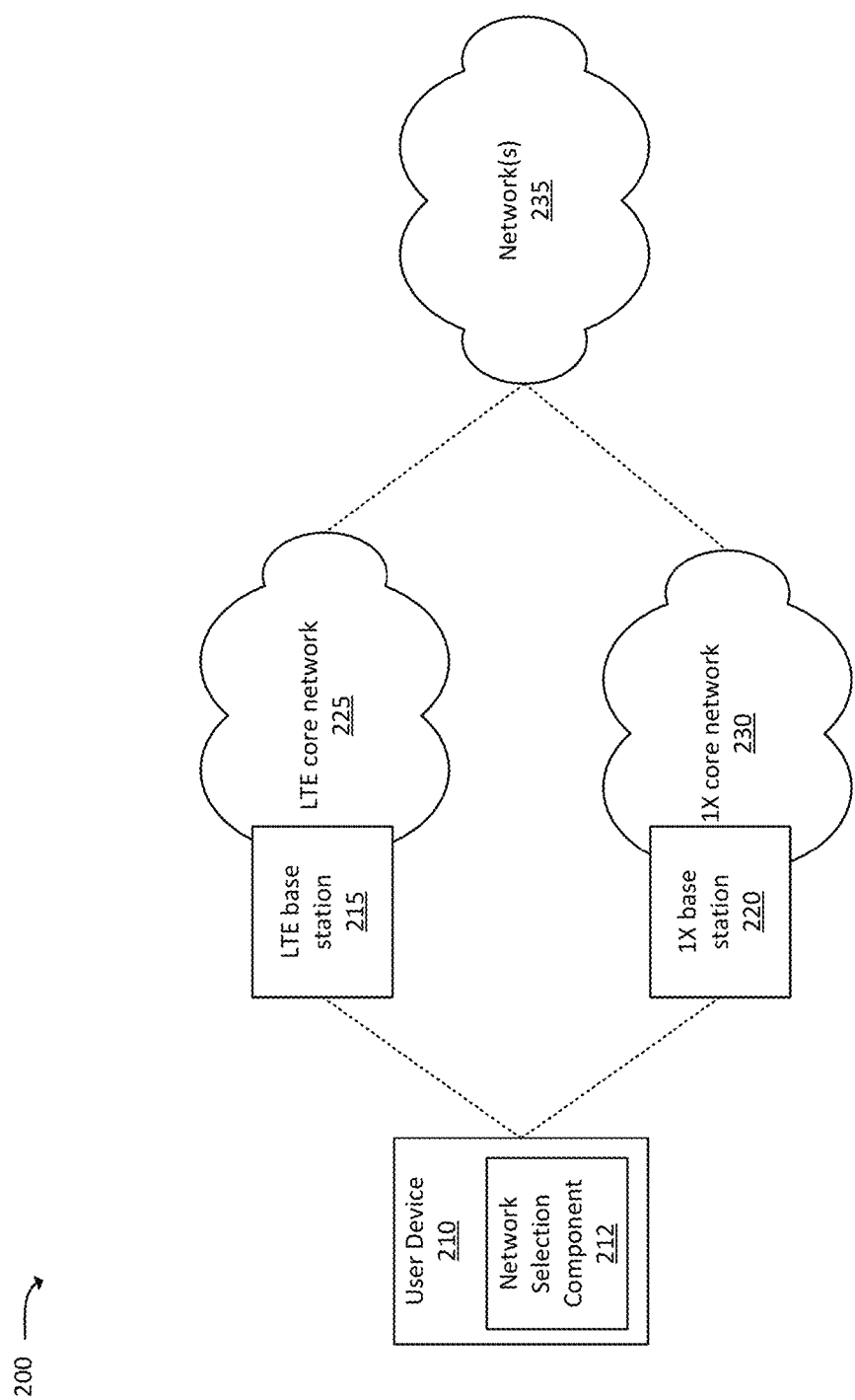
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user device 210, network selection component 212, LTE station 215, 1X base station 220, LTE core network 225, 1X core network 230, and one or more networks 235.

User device 210 may include any computation or communication device, such as a wireless mobile communication device that is capable of communicating with LTE base station 215, 1X base station 220, and/or one or more networks (e.g., network(s) 235). For example, user device 210 may include a radiotelephone, a personal communications system ("PCS") terminal (e.g., that may combine a cellular radiotelephone with data processing and data communications capabilities), a personal digital assistant ("PDA") (e.g., that can include a radiotelephone, a pager, Internet/intranet access, etc.), a smart phone, a laptop computer, a tablet computer, a camera, a personal gaming system, or another type of computation or communication device. User device 210 may send data to and/or receive data from network(s) 235 (e.g., via LTE core network 225 and/or 1X core network 230).

Network selection component 212 may be implemented within user device 210 (e.g., as hardware and/or software associated with user device 210). In some implementations, network selection component 212 may determine that user device 210 is connected to 1X core network 230 (e.g., is attached to 1X base station 220, is in a 1X active mode, and/or is actively transmitting data via to 1X core network 230), and may cause user device 210 to enter a suppression mode when user device 210 is connected to 1X core network 230. In suppression mode, network selection component 212 may force, or may otherwise cause user device 210 to enter 1X idle mode, in which user device 210 may search for an LTE signal (e.g., using a Better System Reselection ("BSR") technique, a More Preferred System Reselection ("MPSR") technique, etc.). Additional operations of network selection component 212 are described below with respect to FIG. 3.

LTE Base station 215 may include one or more network devices that receive, process, and/or transmit traffic, such as audio, video, text, and/or other data, destined for and/or received from user device 210. In an example implementation, LTE base station 215 may be an eNB device and may be part of LTE core network 225. LTE base station 215 may receive traffic from and/or send traffic to network(s) 235 via LTE core network 225 (which may include a serving gateway, a packet data network gateway, a mobility management entity, and/or one or more other devices), and may send traffic to and/or receive traffic from user device 210 via an air interface.

1X base station 220 may include one or more network devices that receive, process, and/or transmit traffic, such as audio, video, text, and/or other data, destined for and/or received from user device 210. In an example implementation, 1X base station 215 may include a Base Transceiver Station ("BTS"), a base station subsystem ("BSS"), and/or a base station controller ("BSC"). 1X base station may receive traffic from and/or send traffic to network(s) 235 via 1X core network 230 (which may include a mobile switching center, a home location register, a visitor location register, and/or one or more other devices), and may send traffic to and/or receive traffic from user device 210 via an air interface.

Networks 235 may include one or more wired and/or wireless networks. For example, PDN 250 may include a cellular network (e.g., 1X network, a 2G network, a third generation 3G network, a fourth generation ("4G") network, a fifth generation ("5G") network, a long-term evolution ("LTE") network, a global system for mobile ("GSM") network, a code division multiple access ("CDMA") network, an evolution-data optimized ("EVDO") network, or the like), a public land mobile network ("PLMN"), and/or another network. Additionally, or alternatively, networks 235 may include a local area network ("LAN"), a wide area network ("WAN"), a metropolitan network ("MAN"), the Public Switched Telephone Network ("PSTN"), an ad hoc network, a managed Internet Protocol ("IP") network, a virtual private network ("VPN"), an intranet, the Internet, a fiber optic-based network, and/or a combination of these or other types of networks.

The quantity of devices and/or networks in environment 200 is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
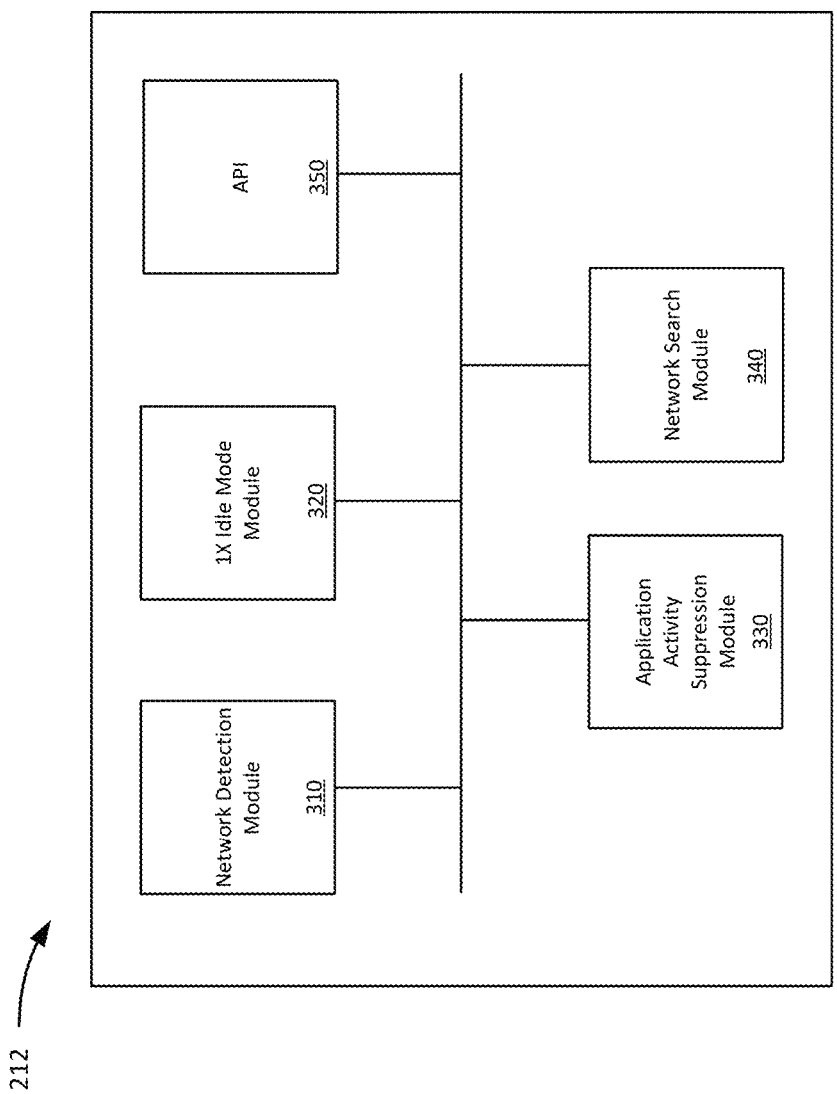
FIG. 3 illustrates example functional components of a network selection component.

FIG. 3 illustrates example functional components of network selection component 212. As shown in FIG. 3, network selection component 212 may include network detection module 310, 1X idle module 320, application activity suppression module 330, network search module 340, and API 350. Network detection module 310 may determine that user device 210 is connected to a network, and may detect the type of network. For example, network detection module 310 may detect that user device 210 has discontinued communications via an LTE network and is instead communicating via a 1X network. Network detection module 310 may notify 1X idle module 320 and/or application activity suppression module 330, that user device 210 is connected to the 1X network.

1X idle module 320 may receive a notification from network detection module 310 that user device 210 is communication via the 1X network. Based on receiving this notification, 1X idle module 320 may force user device 210 to enter a 1X idle mode. For example, after a particular period of time has passed after receiving the notification, 1X idle module 320 may cause user device 210 to temporarily discontinue use of the 1X network, thereby placing the user device into the 1X idle mode. For example, 1X idle module 320 may cause user device 210 to discontinue use of software and/or hardware (e.g., a cellular radio) via which user device 210 may use to communicate with the 1X network.

1X idle module 320 may notify network search module 340 that user device 210 is in the 1X idle mode, and network search module 340 may direct user device 210 to search for an LTE signal when user device 210 is in the 1X idle mode. If an LTE signal is not found within a predetermined period of time (and if the strength of the signal does not satisfy a threshold), user device 210 may resume communications via the 1X network, and network detection module 310 may again notify 1X idle module 320 that user device 210 is communicating via the 1X network.

Based on receiving this second notification, 1X idle module 320 may again place user device 210 in a 1X idle mode, but may do so at increasing intervals. As an example, 1X idle module 320 may place user device 210 in a 1X idle mode after user device 210 has been communicating via the 1X network for 15 seconds. If an LTE signal is not found, user device 210 may reestablish a connection with the 1X network, and 1X idle module 320 may place the user device into the 1X idle mode after user device 210 has been communicating with the 1X network for 30 seconds. If, again an LTE signal is not found after the user device is placed into the 1X idle mode, the user device may reestablish a connection with the 1X network, and 1X idle module 320 may place the user device into the 1X idle mode after user device 210 has been communicating via the 1X network after 60 seconds.

Application activity suppression module 330 may cause user device 210 to suppress network activity for applications running on user device 210. In some implementations, application activity suppression module 330 may suppress the network activity when network detection module 310 detects that user device 210 is communicating via the 1X network, which may cause user device 210 to enter the 1X idle mode. Suppressing application and/or network activity on user device 210 may reduce the network activity on user device 210 to a threshold in which user device 210 is considered to be in a 1X idle mode. 1X idle module 320 may detect that user device 210 is in the 1X idle mode after application activity has been suppressed. For example, after network traffic has been suppressed for a threshold period of time, user device 210 may enter the 1X idle mode after an idle mode expiration timer has expired (e.g., a timer that starts when less than a threshold amount of traffic has been transmitted to and/or from user device 210).

As described in greater detail below with respect to FIGS. 6-9, application activity suppression module 330 may direct particular applications on user device 210 to buffer and/or drop network traffic when user device 210 is communicating via a 1X network. Additionally, or alternatively, application activity suppression module 330 may receive network traffic from particular applications, and buffer/drop this traffic while user device 210 is communicating via the 1X network. In some implementations, application activity suppression module 330 may buffer and/or drop traffic based on the type of traffic, an application from which the traffic originated, the type of application from which the traffic originated, and/or the amount of traffic. For example, application activity suppression module 330 may buffer and/or drop traffic from "high consuming" applications (e.g., applications that output greater than a threshold amount of traffic), such as audio and/or video traffic outputted by a video streaming application, a video calling application, and/or other type of application. Additionally, or alternatively, application activity suppression module 330 may buffer and/or drop traffic from "low consuming" applications (e.g., applications that output less than a threshold amount of traffic). Additionally, or alternatively, application activity suppression module 330 may buffer and/or drop traffic from "background" applications (e.g., applications that are running "in the background," such as applications that synchronize data between user device 210 and an external source).

In some implementations, activity suppression module 330 may reduce the amount of traffic outputted by certain applications while user device 210 is communicating via the 1X network. For example, traffic from different user device applications may be prioritized. When user device 210 is communicating via the 1X network, traffic may be buffered in order of priority. In some situations, some buffered traffic may be dropped. For example, if a buffer is longer than a threshold length, traffic at the "end" of the buffer (e.g., the traffic in the buffer having the relatively lowest priority level) may be dropped. As a result, relatively low priority traffic may be dropped, thereby reducing the amount of traffic transmitted via the 1X network, while still permitting relatively high priority traffic to be transmitted.

Network search module 340 may direct user device 210 to search for an LTE signal when user device 210 has been placed into a 1X idle mode. For example, network search module 340 may receive an indication from 1X idle module 320 that user device 210 is in a 1X idle mode.

API 350 may cause an application on user device 210 to suppress network activity for particular applications running on user device 210. When API 350 detects that user device 210 is no longer communicating via the 1X network and is instead communicating via the LTE network, API 350 may direct application activity suppression module 330 to discontinue suppressing network activity and output traffic via the LTE network.

Figure 4:
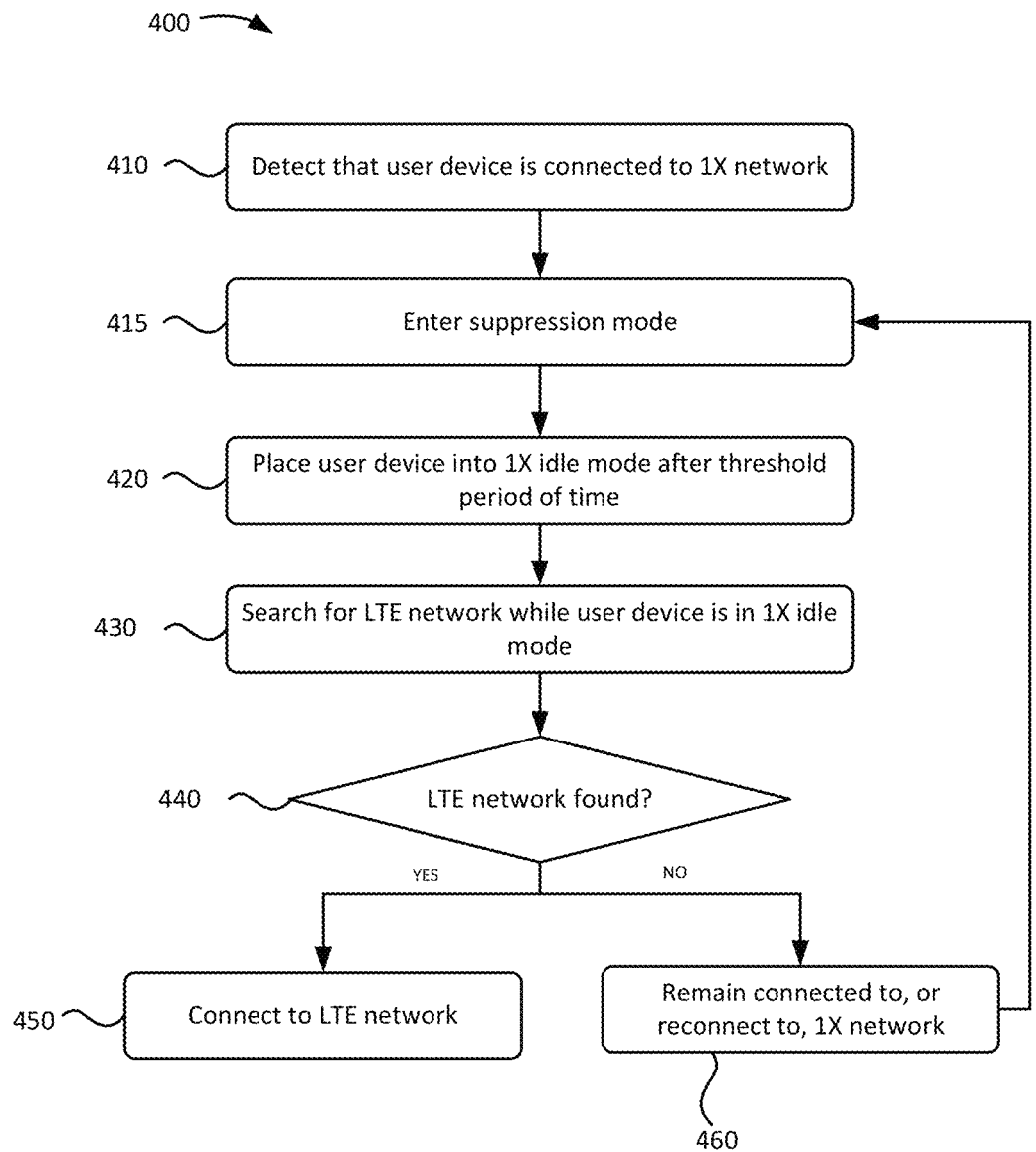
FIGS. 4 and 5 illustrate flowcharts of example processes for placing a user device into a 1X idle mode in order to restore a connection between the user device and an LTE network.

FIG. 4 illustrates a flowchart of an example process 400 for placing a user device into a 1X idle mode in order to restore a connection between the user device and an LTE network. In some implementations, process 400 may be performed by network selection component 212. In some implementations, some or all of blocks of process 400 may be performed by one or more other components or devices.

As shown in FIG. 4, process 400 may include detecting that a user device is communicating via a 1X network (block 410). For example, network selection component 212 may detect that user device 210 is connected to a 1X network (e.g., in lieu of being connected to an LTE network).

As further shown, process 400 may include entering suppression mode (block 415). As described above, suppression mode may be a mode in which user device 210 may be placed in, or forced to enter, 1X idle mode (e.g., by dropping and/or buffering traffic).

When the user device is in suppression mode, process 400 may also include placing the user device into 1X idle mode after a threshold period of time (block 420). For example, network selection component 212 may place user device 210 into a 1X idle mode even while user device 210 is actively communicating via the 1X network. In some implementations, network selection component 212 may cause user device 210 to enter the 1X idle mode by temporarily suppressing traffic (e.g., buffering and/or dropping the traffic) from user device applications instead of transmitting the traffic via the 1X network. After network traffic has been suppressed for a threshold period of time, user device 210 may enter the 1X idle mode after an idle mode expiration timer has expired (e.g., a timer that starts when less than a threshold amount of traffic has been transmitted to and/or from user device 210). Additionally, or alternatively, network selection component 212 may place user device 210 in the 1X idle mode even while user device 210 is actively transmitting traffic via the 1X network (e.g., even if the idle mode expiration timer has not started). Additionally, or alternatively, network selection component 212 may cause user device 210 to enter the 1X idle mode by discontinuing software processes and/or the use of hardware used to communicate via the 1X network. As a result of process block 420, user device 210 may enter the idle mode in a shorter amount of time than if user device 210 were not forced into idle mode (e.g., if user device 210 were to continue to actively transmit traffic via the 1X network).

In some implementations, 1X base station 220 may be unaware that network selection component 212 has placed user device 210 in the idle mode (e.g., user device 210 may not notify 1X base station 220 that user device 210 has entered idle mode). Thus, base station 215 may continue to send traffic to user device 210, but user device 210 may drop this traffic in order to maintain the idle mode. Additionally, or alternatively, user device 210 may discontinue use of hardware and/or software processes used to receive traffic sent by 1X base station 220.

Process 400 may further include searching for an LTE network while the user device is in 1X idle mode (block 430). For example, network search module 340 may search for the LTE network while user device 210 is in the 1X idle mode (e.g., using a BSR technique, an MPSR technique, etc.). In some implementations, network search module 340 may search for the LTE network for a predetermined period of time (e.g., 2 seconds, 5 seconds, 10 seconds, etc.). A longer period of time may increase the chances of allowing user device 210 to locate an LTE signal, but may also lead to a longer service interruption in the event than an LTE signal is not found.

Process 400 may also include determining whether an LTE network has been found (block 440). If, for example, the LTE network has been found (block 440-YES), process 400 may also include connecting to the LTE network (block 450). For example, network selection component 212 may direct user device 210 to connect to the LTE network and communicate via the LTE network. As described in greater detail below, any traffic that had been previously buffered while user device 210 had been placed into 1X idle mode (e.g., in block 420) may be transmitted via the LTE network. In some implementations, a signal strength threshold for which user device 210 may attempt to establish a connection with the LTE network may be reduced in order to increase the chances of user device 210 connecting with the LTE network.

If, on the other hand, an LTE network is not found (block 440-NO), process 400 may include remaining connected to, or reconnecting to, the 1X network (block 460). For example, network selection component 212 may resume the connection via the 1X network (e.g., may place the connection in an active mode). Additionally, or alternatively (e.g., in situations where the connection between user device 210 and the 1X network has been broken), user device 210 may reconnect to the 1X network when an LTE network has not been found within a threshold period of time (e.g., to restore network connectivity for user device 210). Network selection component 212 may then again place user device 210 in the 1X idle mode (e.g., by suppressing 1X network activity) after a threshold period of time (block 420) in order to search for the LTE network (block 430). This threshold period of time may be longer than when user device 210 was originally placed in 1X idle mode. If an LTE network again is not found within a threshold period of time (block 440-NO), network selection component 212 may again reconnect to the 1X network (block 460), and again place user device 210 in the 1X idle mode after a threshold period of time (block 420).

Figure 5:
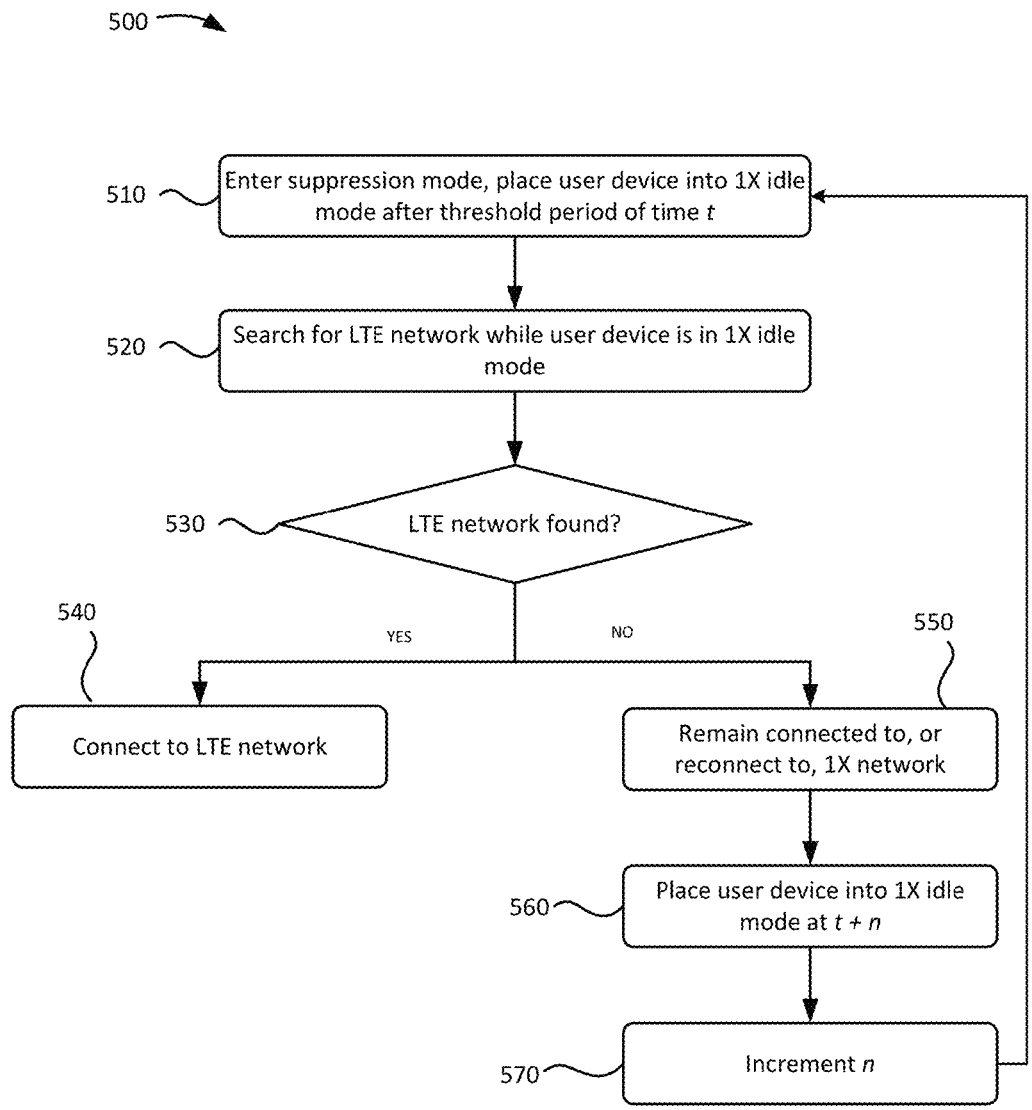

FIG. 5 illustrates a flowchart of another example process 500 for placing a user device into a 1X idle mode in order to restore a connection between the user device and an LTE network. In some implementations, process 500 may be performed by network selection component 212. In some implementations, some or all of blocks of process 500 may be performed by one or more other components or devices. In FIG. 5, assume that a user device is currently communicating via a 1X network.

As shown in FIG. 5, process 500 may include placing the user device into 1X idle mode after a threshold period of time (block 510). For example, network selection component 212 may place user device 210 into 1X idle mode (e.g., by suppressing 1X network activity) after a threshold period of time, such as time t (where t is a number greater than 0).

Process 500 may further include searching for an LTE network while the user device is in 1X idle mode (block 520). For example, network search module 340 may search for the LTE network while user device 210 is in the 1X idle mode (e.g., using a BSR technique, an MPSR technique, etc.).

Process 500 may also include determining whether an LTE network has been found (block 530). For example, network selection component 212 may determine whether an LTE network has been found after searching for the LTE network while user device 210 is in the 1X idle mode. If, for example, the LTE network has been found (block 530-YES), process 500 may also include connecting to the LTE network (block 540). For example, network selection component 212 may direct user device 210 to connect to the LTE network and communicate via the LTE network.

If, on the other hand, an LTE network is not found (block 530-NO), process 500 may include remaining connected to, or reconnecting to, the 1X network (block 550). For example, network selection component 212 may resume the connection via the 1X network (e.g., may place the connection in an active mode). Additionally, or alternatively (e.g., in situations where the connection between user device 210 and the 1X network has been broken), user device 210 may reconnect to the 1X network when an LTE network has not been found within a threshold period of time (e.g., to restore network connectivity for user device 210). Network selection component 212 may then again place user device 210 into the 1X idle mode after a threshold period of time (block 560). For example, network selection component 212 may place user device 210 into the 1X idle mode after a threshold period of time, such as t+n (where n is a number greater than zero). Additionally, the value of n may be incremented (e.g., increased, such as by a fixed amount or by a variable amount) (block 570). For instance, as described below, on subsequent respective iterations of blocks 520-560, the value of n may be different (e.g., n may be a greater value on the third iteration than on the second iteration). In some implementations, n may be a function of a location of user device 210. For example, if user device 210 is in a rural area, n may be relatively larger than if user device 210 was in an urban area.

Process 500 may again include searching for an LTE network while the user device is in the 1X idle mode (block 520). If an LTE network again is not found within a threshold period of time (block 530-NO), network selection component 212 may remain connected to the 1X network (block 550), and again place user device 210 in the 1X idle mode after a threshold period of time (block 560). This threshold period of time may be even longer than when user device 210 was originally placed in 1X idle mode and when user device 210 was placed in the 1X idle mode for a second time. That is, the variable n may be increased each time user device 210 reconnects to the 1X network after having had been placed into the 1X idle mode.

Figure 6:
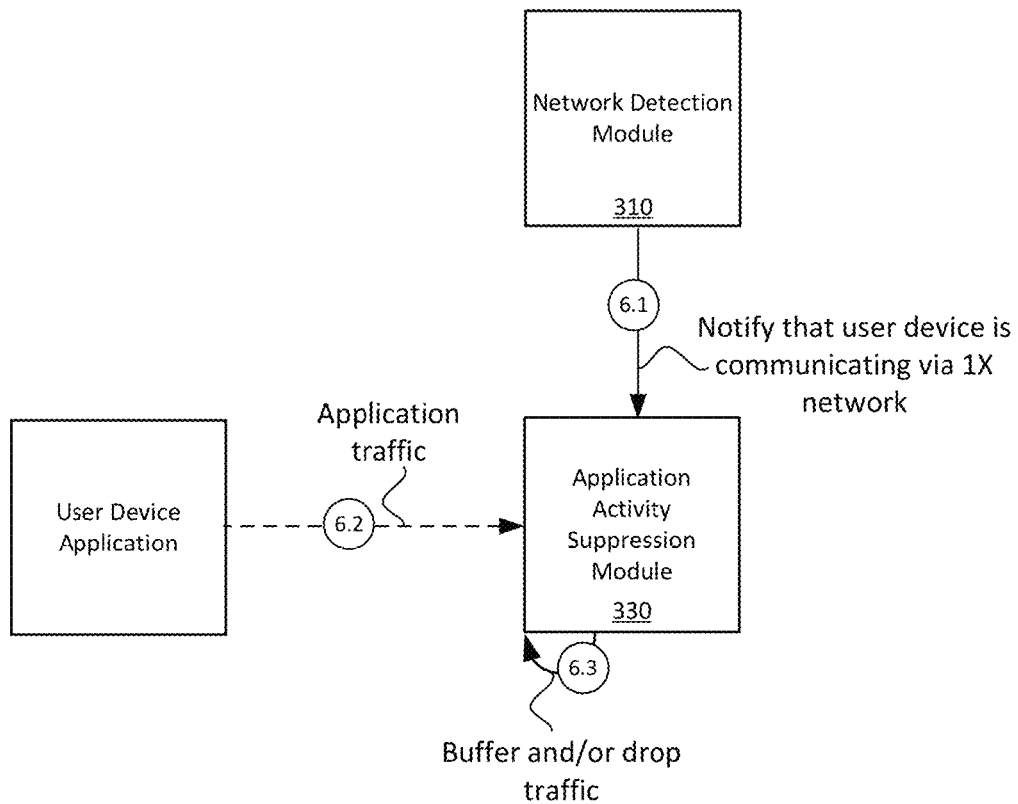
FIG. 6 illustrates an example implementation for buffering and/or dropping traffic when a user device is placed into a 1X idle mode.

FIG. 6 illustrates examples an example implementation for buffering and/or dropping traffic when a user device is placed into a 1X idle mode. As shown in FIG. 6, network detection module 310 may notify application activity suppression module 330 that user device 210 is communicating via a 1X network (arrow 6.1). As a user device application (e.g., a network application that sends and/or receives traffic, such as a voice call application, a video call application, a chat application, a web browsing application, etc.) transmits traffic (arrow 6.2), application activity suppression module 330 may suppress the traffic (e.g., buffer the traffic and/or drop the traffic) (arrow 6.3), which may, in effect, prevent the traffic from being transmitted via the 1X network.

As mentioned above, an idle mode timer may begin when traffic has not been sent, from user device 210 via the 1X network. As also mentioned above, upon expiration of the idle mode timer, user device 210 may enter a 1X idle mode. Thus, after traffic has been suppressed (at arrow 6.3), user device 210 may enter a 1X idle mode at the expiration of the idle mode timer. In some implementations, traffic from particular applications running in a background of user device 210 may be suppressed. Additionally, or alternatively, traffic from any or all applications running on user device 210 may be suppressed in order to facilitate the reduction of 1X data usage and/or the expiration of the idle mode timer, thereby causing user device 210 to enter the 1X idle mode and subsequently search for an LTE network (e.g., using a BSR technique, an MPSR technique, etc.).

Figure 7:
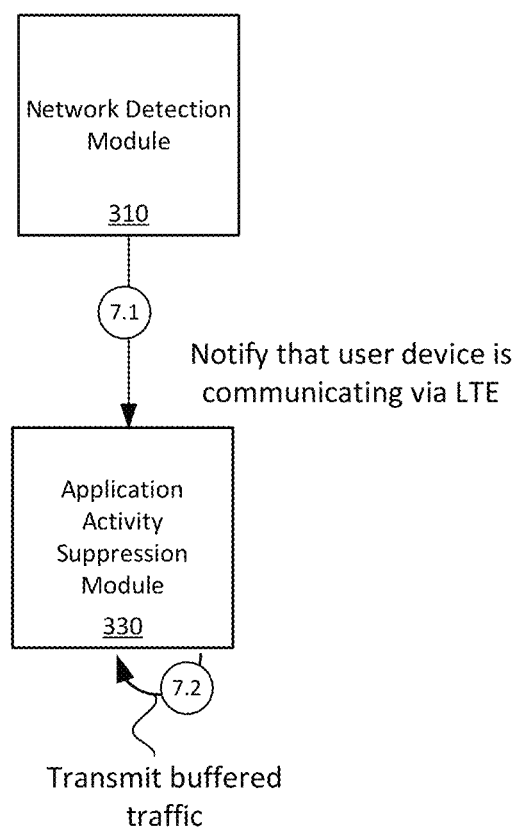
FIG. 7 illustrates an example implementation for transmitting previously buffered traffic when a user device connects with an LTE network.

FIG. 7 illustrates an example implementation for transmitting previously buffered traffic when a user device connects to an LTE network (e.g., after performing a BSR technique, an MPSR technique, etc.). In FIG. 7, assume that a user device application had previously buffered traffic while user device 210 was in 1X idle mode. As shown in FIG. 7, network detection module 310 may notify application activity suppression module 330 that user device 210 is communicating via an LTE network (arrow 7.1). Application activity suppression module 330 may then transmit previously buffered traffic via the LTE network (arrow 7.2).

Figure 8:
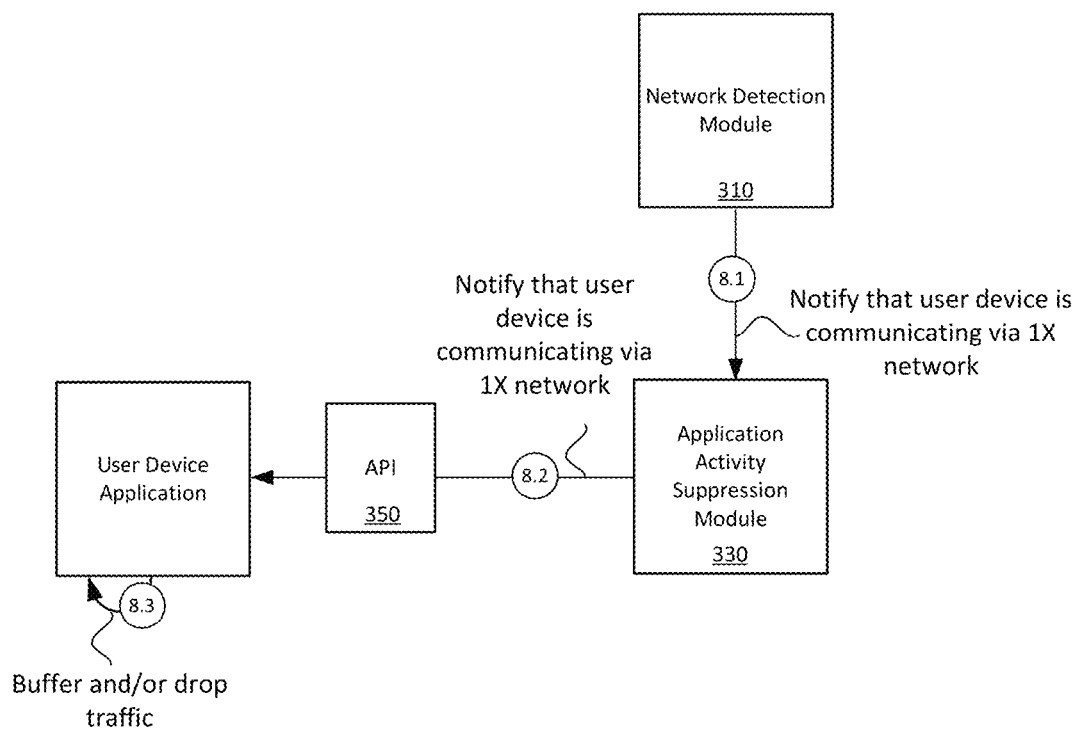
FIG. 8 illustrates an example implementation for buffering and/or dropping traffic, via an application programming interface ("API"), when a user device is placed into a 1X idle mode.

FIG. 8 illustrates an example implementation for buffering and/or dropping traffic, via an API, when a user device is placed into a 1X idle mode. As shown in FIG. 8, network detection module 310 may notify application activity suppression module 330 that user device 210 is communicating via a 1X network (arrow 8.1). Application activity suppression module 330 may then notify a user device application (e.g., via API 350) that user device 210 is connected to the 1X network (arrow 8.2). Based on receiving this notification, the user device application may itself suppress its own traffic by buffering and/or dropping the traffic (arrow 8.3). This suppression of traffic may facilitate the reduction of 1X data usage and/or the expiration of an idle mode timer, thereby causing user device 210 to enter the 1X idle mode and subsequently search for an LTE network (e.g., using a BSR technique, an MPSR technique, etc.). Additionally, or alternatively, network detection module 310 may notify user device application (e.g., via API 350, and without involving application activity suppression module 330) that user device 210 is connected to the LTE network.

Figure 9:
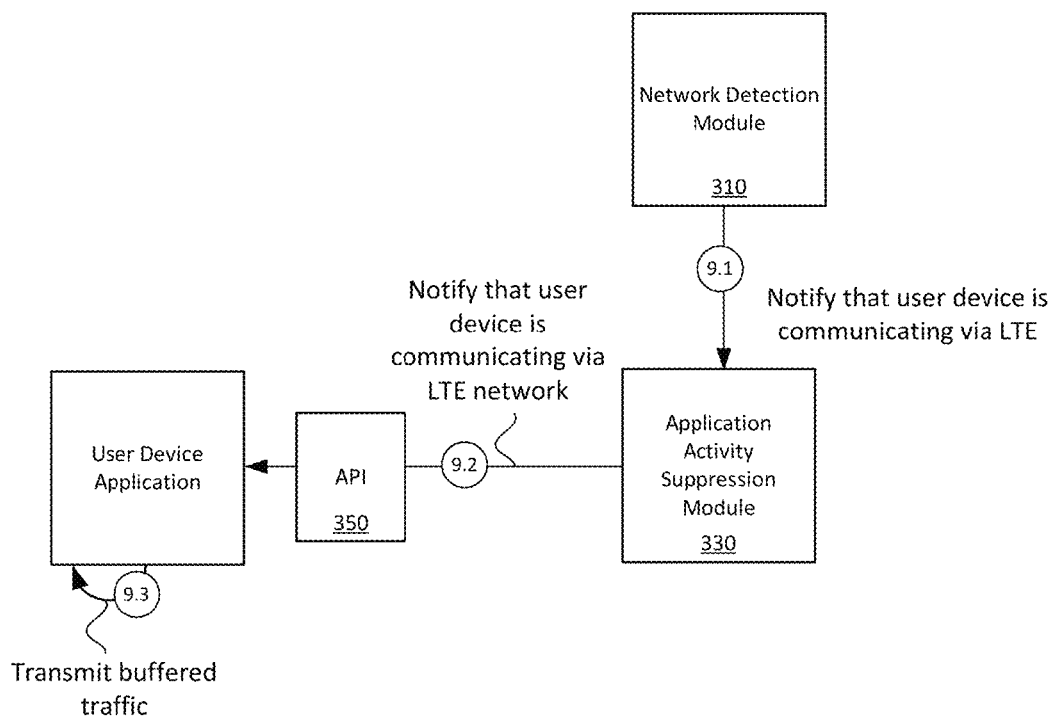
FIG. 9 illustrates an example implementation for transmitting previously buffered traffic, via an API, when a user device connects with an LTE network.

FIG. 9 illustrates an example implementation for transmitting previously buffered traffic, via an API, when a user device connects with an LTE network. In FIG. 9, assume that a user device application had previously buffered traffic while user device 210 was in 1X idle mode. As shown in FIG. 9, network detection module 310 may notify application activity suppression module 330 that user device 210 is communicating via an LTE network (arrow 9.1). Application activity suppression module 330 may, in turn, notify the user device application (e.g., via API 350) that user device 210 is communicating the LTE network (arrow 9.2). The user device application may then transmit the buffered traffic via the LTE network (arrow 9.3). Additionally, or alternatively, network detection module 310 may notify user device application (e.g., via API 350, and without involving application activity suppression module 330) that user device 210 is connected to the LTE network.

Figure 10:
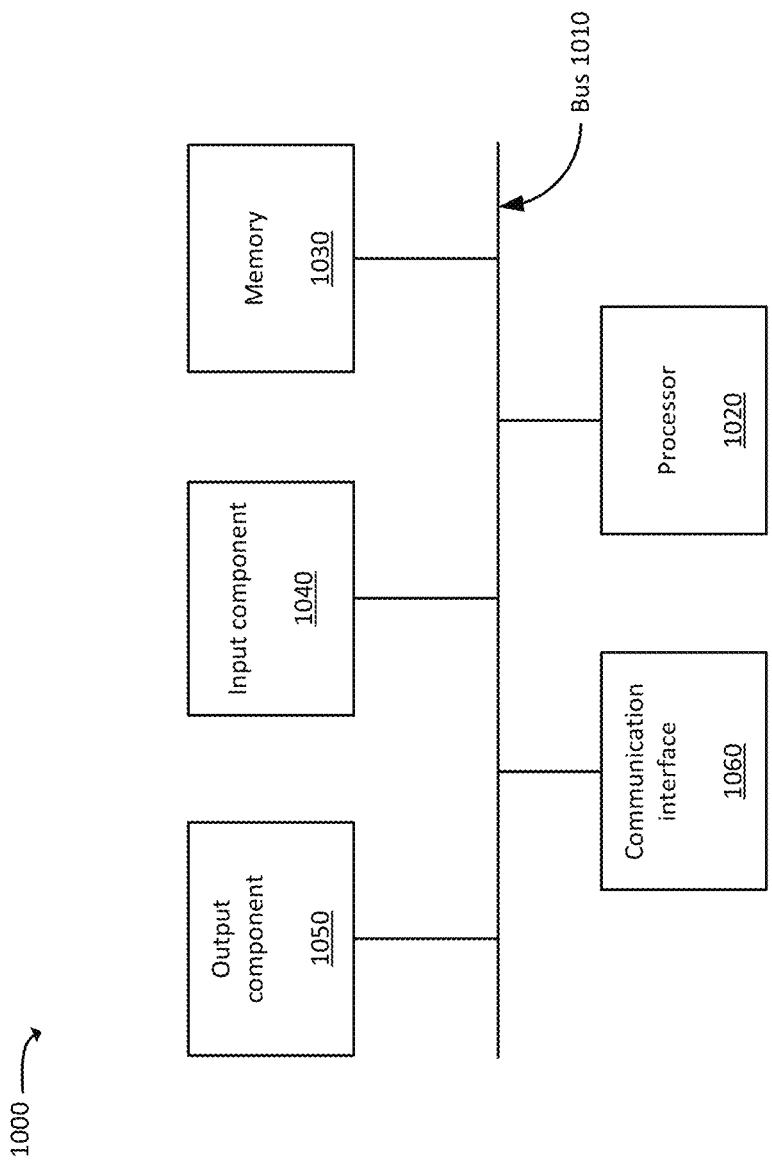
FIG. 10 illustrates example components of one or more devices, according to one or more implementations described herein.

FIG. 10 is a diagram of example components of device 1000. One or more of the devices described above (e.g., with respect to FIGS. 1A-1C, 2, 3, and 6-9) may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as a cellular radio transceiver, an infrared ("IR") receiver, a Bluetooth® radio (Bluetooth is a registered trademark of Bluetooth SIG, Inc.), radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 4 and 5, the order of the blocks may be modified in other implementations. Further, non-dependent blocks may be performed in parallel.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 2 and 3), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. The term "greater than"(or similar terms), as used herein to describe a relationship of a value to a threshold, may be used interchangeably with the term "greater than or equal to" (or similar terms). Similarly, the term "less than" for similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms, depending on the context in which the threshold is used.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A user device, comprising:
  a non-transitory memory device storing a plurality of processor-executable instructions; and
  a processor configured to execute the processor-executable instructions, wherein executing the processor-executable instructions causes the processor to:
    detect that the user device is communicating via a first network that is less preferred than a second network, to which the user device is not connected;
    determine that the user device has communicated via the first network for a threshold duration of time;

force the user device to enter an idle mode, based on determining that the user device has communicated via the first network for the threshold duration of time, and while the user device is actively communicating via the first network;
search for the second network while the user device is in the idle mode, the second network being different than the first network;
determine whether the second network has been found based on the searching performed while the user device is in the idle mode;
when the second network has not been found based on the searching:
increase the threshold duration of time, based on the second network not having been found;
reconnect to the first network;
after reconnecting to the first network, determine that the user device has communicated via the first network for the increased threshold duration of time;
force the user device to enter the idle mode based on determining that the user device has communicated via the first network, after reconnecting to the first network, for the increased threshold duration of time; and
search for the second network while the user device is in the idle mode; and
connect the user device to the second network when the second network has been found based on the searching.

2. The user device of claim 1, wherein executing the processor-executable instructions, to enter the idle mode, further causes the processor to suppress transmission of traffic outputted from one or more particular applications of the user device.

3. The user device of claim 1, wherein executing the processor-executable instructions, to enter the idle mode, further causes the processor to provide an instruction to an application, running on the user device, to suppress transmission of traffic from the application.

4. The user device of claim 1, wherein executing the processor-executable instructions, to enter the idle mode, further causes the processor to prevent transmission of traffic, from the user device, via the first network.

5. The user device of claim 1, wherein executing the processor-executable instructions further causes the processor to:
buffer outgoing traffic, in a memory device associated with the user device, while the user device is in the idle mode; and
output the buffered traffic via the second network after connecting to the second network.

6. The user device of claim 1, wherein executing the processor-executable instructions, to search for the second network, causes the processor to perform at least one of:
a Better System Reselection technique, or
a More Preferred System Reselection technique.

7. The user device of claim 1, wherein the first network corresponds to a Code Division Multiple Access 2000 1X network, and wherein the second network corresponds to a Long-Term Evolution network.

8. A method comprising:
detecting, by a user device, that the user device is communicating via a first network and not via a second network, wherein the second network is preferred over the first network;
entering, by the user device and after the user device has communicated via the first network for a threshold duration of time, into an idle mode when the user device is actively communicating via the first network, the entering including interrupting active outgoing communications from the user device;
searching, by the user device, for the second network while the user device is in the idle mode;
determining, by the user device and based on the searching, whether the second network has been found;
when the second network has not been found:
remaining connected to, or reconnecting to, the first network;
increasing the threshold duration of time based on determining that the second network has not been found;
actively communicating via the first network after remaining connected to, or reconnecting to, the first network;
entering, after the user device has actively communicated via the first network for the increased threshold duration of time, the idle mode; and
searching, after entering the idle mode and after the expiration of the increased threshold duration of time, for the second network; and
connecting, by the user device, the user device to the second network when the second network has been found.

9. The method of claim 8, wherein entering the idle mode includes suppressing a transmission of traffic outputted from one or more particular applications of the user device.

10. The method of claim 8, wherein entering the idle mode includes providing an instruction to an application, running on the user device, to suppress a transmission of traffic from the application.

11. The method of claim 8, wherein entering the idle mode includes preventing transmission of traffic, from the user device, via the first network.

12. The method of claim 8, further comprising:
buffering outgoing traffic, in a memory device associated with the user device, while the user device is in the idle mode; and
outputting the buffered traffic via the second network after connecting to the second network.

13. The method of claim 8, wherein searching for the second network includes performing at least one of:
a Better System Reselection technique, or
a More Preferred System Reselection technique.

14. The method of claim 8, wherein the first network corresponds to a Code Division Multiple Access 2000 1X network, and wherein the second network corresponds to a Long-Term Evolution network.

15. A user device comprising:
a non-transitory memory device storing a plurality of processor-executable instructions; and
a processor configured to execute the processor-executable instructions, wherein executing the processor-executable instructions causes the processor to:
detect that the user device is communicating via a first network that is less preferred than a second network;
force the user device to enter an idle mode, based on the detecting, after a first threshold period of time while the user device is actively communicating via the first network;
search for the second network while the user device is in the idle mode;

determine whether the second network has been found based on searching for the second network;

remain connected to, or reconnect to, the first network when the second network has not been found;

increase, after remaining connected to, or reconnecting to, the first network, the first threshold first period of time by a particular duration to yield a second threshold period of time that is greater than the first threshold period of time, the increasing being performed based on determining that the second network has not been found; and force the user device to enter the idle mode after the second threshold period of time after remaining connected to, or reconnecting to, the first network.

16. The user device of claim 15, wherein executing the processor-executable instructions, to enter the idle mode, further causes the user device to buffer traffic associated with one or more applications running on the user device.

17. The user device of claim 15, wherein executing the processor-executable instructions, to enter the idle mode, further causes the processor to provide an instruction, to an application running on the user device, to suppress transmission of traffic from the application.

18. The user device of claim 15, wherein the first network corresponds to a Code Division Multiple Access 2000 1X network, and wherein the second network corresponds to a Long-Term Evolution network.

19. The user device of claim 15, wherein executing the processor-executable instructions further causes the user device to:

search, while in the idle mode after being forced into the idle mode after the second threshold period of time, for the second network;

detect, based on the searching while in the idle mode after being forced into the idle mode after the second threshold period of time, that the second network is available; and connect to the second network based on detecting that the second network is available.

20. The user device of claim 15, wherein executing the processor-executable instructions, to enter the idle mode, further causes the user device to discard traffic associated with one or more applications running on the user device.

* * * * *